(12) United States Patent
Gleason et al.

(10) Patent No.: US 10,686,523 B1
(45) Date of Patent: Jun. 16, 2020

(54) CO-BORESIGHTED OPTICAL AND RF PHASED ARRAY AND PHOTONIC INTEGRATED CIRCUIT

(71) Applicant: Raytheon Company, Waltham, MA (US)

(72) Inventors: Benn Gleason, Tucson, AZ (US); Sean D. Keller, Tucson, AZ (US); Gerald P. Uyeno, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/419,739

(22) Filed: May 22, 2019

(51) Int. Cl.
| | |
|---|---|
| *H04B 10/112* | (2013.01) |
| *H01Q 3/26* | (2006.01) |
| *G02F 1/29* | (2006.01) |
| *H04B 10/2575* | (2013.01) |
| *H01Q 21/29* | (2006.01) |
| *H01Q 3/34* | (2006.01) |
| *H04B 10/11* | (2013.01) |

(52) U.S. Cl.
CPC ....... *H04B 10/25752* (2013.01); *G02F 1/292* (2013.01); *H01Q 3/2658* (2013.01); *H01Q 3/2676* (2013.01); *H01Q 3/34* (2013.01); *H01Q 21/29* (2013.01); *H04B 10/11* (2013.01); *H04B 10/1129* (2013.01)

(58) Field of Classification Search
CPC ...... H01Q 3/2658; H01Q 3/2676; H01Q 3/34; H01Q 21/19; G02F 1/292
USPC .................................................. 398/115, 116
See application file for complete search history.

(56) References Cited

U.S. PATENT DOCUMENTS

| | | | |
|---|---|---|---|
| 5,333,000 A | 7/1994 | Hietala et al. | |
| 6,574,021 B1* | 6/2003 | Green | H01Q 3/22 342/157 |
| 9,270,372 B2* | 2/2016 | Miniscalco | H04B 10/1129 |
| 9,614,280 B2* | 4/2017 | Shi | H01Q 3/2682 |
| 9,719,924 B1* | 8/2017 | Stratis | F41G 7/008 |
| 9,997,831 B2* | 6/2018 | Stratis | F41G 7/2246 |
| 10,141,624 B2* | 11/2018 | Stratis | F42B 15/34 |

(Continued)

OTHER PUBLICATIONS

Stulemeijer, J., "Photonic Integrated Beamformer for a Phased Array Antenna," ECOC '98, Sep. 20-24, 1998, Madrid Spain.

(Continued)

*Primary Examiner* — Li Liu
(74) *Attorney, Agent, or Firm* — Eric A. Gifford

(57) ABSTRACT

A photonic integrated circuit (PIC) provides a common architecture to feed both optical and RF phased arrays to produce steerable co-boresighted optical and RF beams from a single chip. The PIC may be used for guidance, mobile data links, autonomous vehicles and 5G cellular communications. A plurality of switches are monolithically fabricated on the PIC with the optical feed network to switch the optical power of the phase-modulated optical channel signals between the integrated optical antennas and the RF antennas to produce steerable optical and RF beams. The photo-detectors and RF antennas may be discrete components or integrated with the optical feed network. To ensure that the optical and RF beams are co-boresighted (within a specified angular tolerance) for the same steering commands, the PIC is positioned within the RF antenna array footprint.

17 Claims, 8 Drawing Sheets

(56) References Cited

U.S. PATENT DOCUMENTS

| | | | | |
|---|---|---|---|---|
| 2002/0075183 | A1* | 6/2002 | Stephens | H01Q 3/2676 |
| | | | | 342/368 |
| 2003/0080899 | A1* | 5/2003 | Lee | H01Q 3/2676 |
| | | | | 342/368 |
| 2004/0062469 | A1* | 4/2004 | Ionov | H04B 10/11 |
| | | | | 385/15 |
| 2012/0068880 | A1* | 3/2012 | Kullstam | G01S 3/38 |
| | | | | 342/54 |
| 2012/0177376 | A1* | 7/2012 | Chang | H04B 10/112 |
| | | | | 398/115 |
| 2014/0270749 | A1* | 9/2014 | Miniscalco | H04B 10/038 |
| | | | | 398/5 |
| 2014/0376914 | A1* | 12/2014 | Miniscalco | H04B 10/1129 |
| | | | | 398/58 |
| 2016/0036529 | A1* | 2/2016 | Griffith | H01Q 21/061 |
| | | | | 398/116 |
| 2017/0214134 | A1* | 7/2017 | Stratis | F41G 7/008 |
| 2017/0301991 | A1* | 10/2017 | Stratis | F41G 7/2246 |
| 2017/0358836 | A1* | 12/2017 | Stratis | F42B 15/34 |

OTHER PUBLICATIONS

Behrooz et al., "A 21-D Heterodyne Lens-Free Optical Phased Array Camera with Reference Phase Shifting," ILLL Photonics Journal, vol. 10, No. 5, Sep. 2018.

Fatemi et al., "A Low Power PWM Optical Phased Array Transmitter with 16° Field-of-View and 0.8° Beamwidth," 2018 IEEE Radio Frequency Integrated Circuit Symposium.

Fatemi et al., "A Nonuniform Sparse 2-D Large-FOV Optical Phased Array With a Low-Power PWM Drive," 2019 IEEE, IEEE Journal of Solid State Circuits.

Analog Photonics, "APSUNY Process Development Kit Full-Build Component Library Documentation," Sponsored by AIM Photonics Institute, copyright 2017.

Kohno et al., "Ghost imaging using a large-scale silicon photonic phased array chip," Optics Express 3817, vol. 27, No. 3, Feb. 4, 2019.

Jung et al., "High efficiency low threshold current 1.3 µm InAs quantum dot lasers on on-axis (001) GaP/Si," Applied Physics Letters III, 122107 (2017).

* cited by examiner

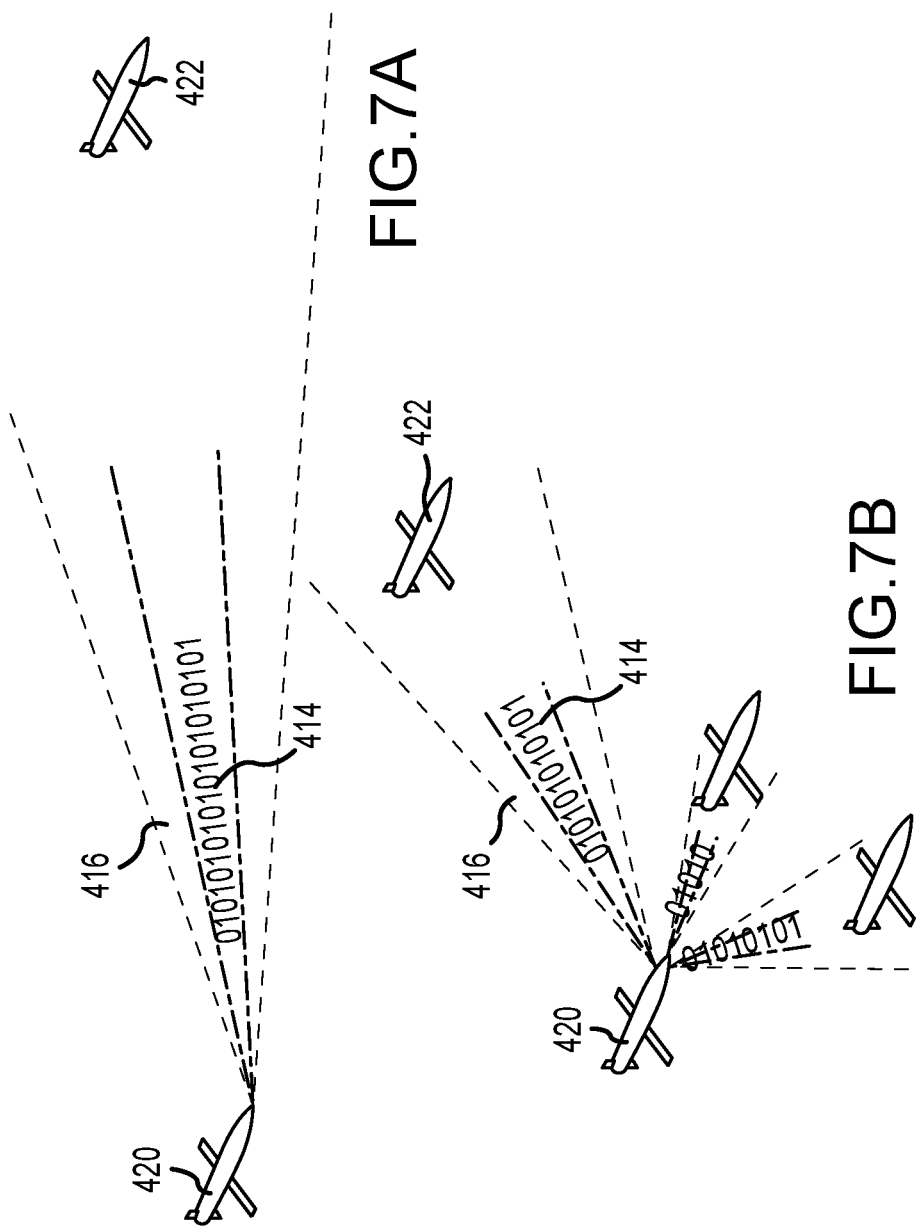

CO-BORESIGHTED OPTICAL AND RF PHASED ARRAY AND PHOTONIC INTEGRATED CIRCUIT

BACKGROUND OF THE INVENTION

Field of the Invention

This invention relates to co-boresighted optical and radio frequency (RF) sources and more particularly to a photonic integrated circuit (PIC) that provides a common architecture for both optical and RF phased arrays to produce co-boresighted optical and RF beams that may be used in applications such as mobile data links, autonomous vehicle navigation or 5G communication.

Description of the Related Art

RF transmitters are used to broadcast signals for such applications as radio and televisions, establish bi-directional communications such as between cell phones and as part of radar systems. The RF (microwave) spectrum extends to 300 GHz with 20 kHz-30 GHz representing conventional RF applications and 30-300 GHz referred to as millimeter wave (MMW). The RF transmitter generates an electrical feed signal a desired RF reference frequency that drives an RF antenna to broadcast the RF beam.

One type of RF transmitter is known as a "phased array", a computer-controlled array of antennas that creates a beam of RF waves that can be electronically steered to point in different directions without moving the antennas. In a phased array, the RF electrical feed signal is fed to the individual antennas with the correct phase relationship so that the RF waves from the separate antenna add together to increase the radiation in a desired direction, while cancelling to suppress radiation in undesired directions. The power from the transmitter is fed to the antennas through devices called phase shifters, controlled by the computer system, which can alter the phase electronically, thus steering the beam of RF waves to a different direction. Since the phased array typically comprises many small antennas (sometimes thousands) to achieve high gain, phased arrays are mainly practical at the higher frequency end of the RF spectrum, in which the antenna elements are conveniently small.

A drawback to phased RF phased arrays is the large volume and weight of the RF-electronic beamforming network. This problem is overcome using an optical feed network to provide the RF electrical feed signals. The principle of operation uses a coherent detection scheme to directly transfer the phase and amplitude of an optical signal to a microwave signal by mixing this signal with an optical local oscillator (LO) signal. If the optical frequency of the LO signal differs by 10 GHz from the input signal than a 10 GHz microwave signal with the same phase and amplitude as the optical signal will be obtained after combination and detection of the two signals. In this way, modulation of phase and amplitude of a microwave signal can be performed using optical phase and amplitude modulators, which are much smaller than their counterpart RF devices. An optical chip known as a "photonic integrated circuit" (PIC) has two inputs for two optical signals 10 GHz frequency difference, one of which is modulated with the radar pulse. The two inputs are fed to a 2×16 power splitting network, the outputs of which are sored in pairs. Each pair is connected to a phase and amplitude modulation section, after which the two signals are fed to a 3-dB coupler. The RF-signals are obtained by coupling the signals coming out of the sixteen 3-dB couplers to a series of 16 discrete optical detectors off-chip. See "Photonic Integrated Beamformer for a Phased Array Antenna" J. Stulemeijer, et. al. ECOC '98, 20-24 Sep. 1998 Madrid, Spain and "Radiofrequency signal-generation system with over seven octaves of continuous tuning" Garret J Schneider, et. al. Nature Photonics, 20 Jan. 2013.

The principles behind RF phased arrays can also be applied to the optical spectrum where they are referred to as Optical Phased Arrays (OPAs). The optical spectrum is typically quoted at 1550 nm (193 THz) for telecommunication purposes but includes wavelengths from the ultraviolet (<400 nm, 750 THz) through the infrared (up to 15,000 nm, 20 THz). OPAs have received considerable attention due to the numerous applications they enable such as LiDAR, high-speed free-space point-to-point communications and sensing with compact and favorable form factors. A basic OPA architecture provides an optical signal to a 1-to-N optical waveguide splitter that splits the signal into optical channel signals. N electro-optic phase modulators, responsive to computer-controlled steering commands, phase modulate the optical channel signals. These optical channel signals are fed to N EO antennas (e.g., nano-antennas), which produce a steerable optical beam. California Institute of Technology has been a leader in the development of OPAs and the integration of many of the optical elements on a single chip or PIC. See "A 1-D Heterodyne Lens-Free Optical Phased Array Camera With Reference Phase Shifting" B. Abiri et. al IEEE Photonics Journal Volume 10 Number 5, September 2018, "A Low Power PWM Optical Phased Array Transmitter With 16° F.ield-Of-View and 0.8° Beamwidth" Reza Fatemi et. al. 2018 IEEE Radio Frequency Integrated Circuits Symposium (RFIC), 10-12 Jun. 2018 pp. 28-31 and "A Nonuniform Sparse 2-D Large-FOV Optical Phased Array With a Low-Power PWM Drive" Reza Fatemi et. al. IEEE Journal of Solid-State Circuits 22 Feb. 2019, pages 1-16.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a photonic integrated circuit (PIC) that provides a common architecture for both optical and RF phased arrays that generate steerable and co-boresighted optical and RF beams. The PIC may be used to provide steerable optical and RF beams for applications such as guidance, mobile data links, autonomous vehicles and 5G cellular communications.

This is accomplished with an optical feed network that splits first and second optical signals having a frequency difference equal to a desired RF frequency into an equal number of first and second optical channel signals, phase modulates the first optical channel signals, combines the phase-modulated first and the second optical channel signals and uses photo-detectors to convert the combined optical channel signals to RF electrical feed signals at a respective plurality of RF bond pads, which are coupled to RF antenna elements of an RF phased array. A plurality of switches selectively re-direct the phase-shifted first optical channel signals to feed a respective plurality of optical antennas to produce a steerable optical beam. The switches may be binary switches that time multiplex the steerable optical and RF beams or as variable splitters that apportion the optical power between the optical and the RF to generate coincident optical and RF beams. The switches may be positioned either before or after the optical combiners. The optical feed network, the switches and the optical antennas are monolithically fabricated on the PIC. The photo-detectors and RF antenna elements may also be integrated on the PIC. To ensure that the optical and RF beams are co-boresighted (within a specified angular tolerance) for the same steering commands, the PIC is positioned within the RF antenna array footprint.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7a through 7b illustrate a flat or concave array in which the switchable optical/RF sources may act independently to steer their respective optical and RF beams or in coordination to increase the power of a single optical and RF beam.

DETAILED DESCRIPTION OF THE INVENTION

The present invention describes a photonic integrated circuit (PIC) that provides a common architecture to feed both optical and RF phased arrays to produce co-boresighted optical and RF beams. A plurality of switches are monolithically fabricated on the PIC with the optical feed network to switch the optical power of the phase-modulated optical channel signals between the integrated optical antennas and the RF antennas to produce steerable optical and RF beams. The photo-detectors and RF antennas may be discrete components or integrated with the optical feed network. To ensure that the optical and RF beams are co-boresighted (within a specified angular tolerance of half the optical beamwidth) for the same steering commands, the PIC is positioned within the RF antenna array footprint. This ensures that the optical beam will pick up the RF target for hand-off or establishing and maintaining the high rate optical link.

Figure 1A:
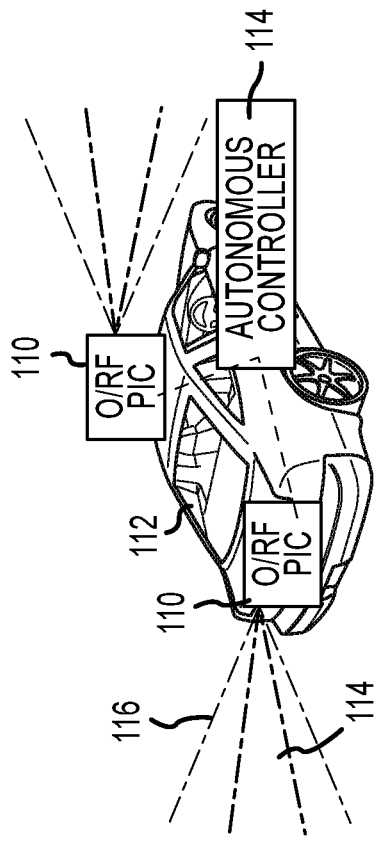
FIGS. 1a through 1c illustrate application of the co-boresighted optical/RF source for mobile communications, autonomous vehicles and 5G cellular communications.
Figure 1B:
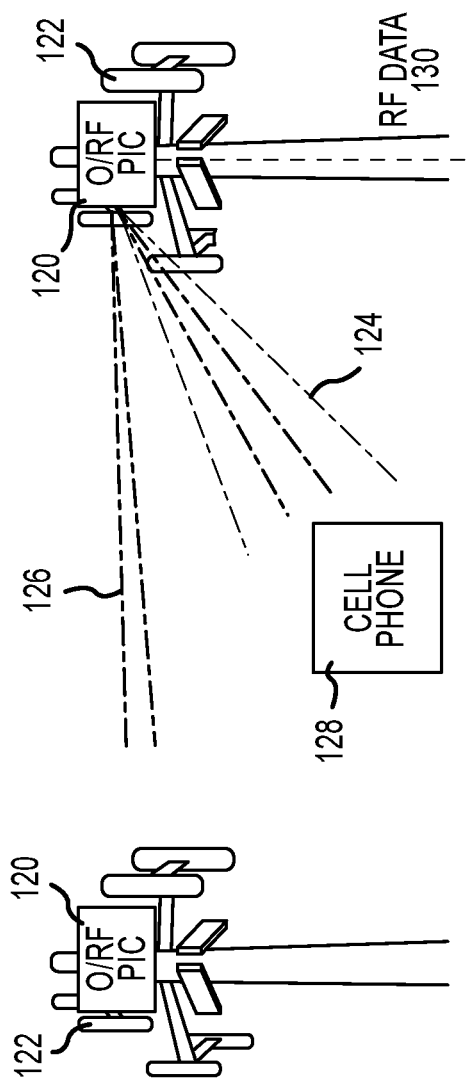
Figure 1C:
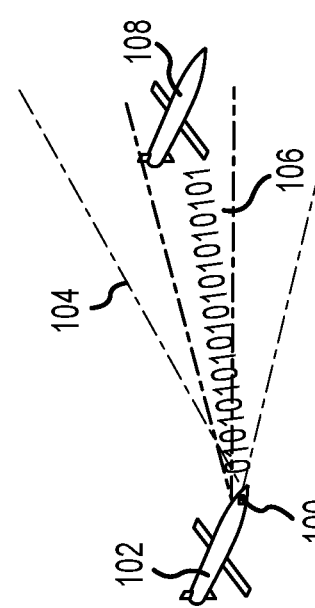

In reference to FIGS. 1a through 1c, a dual EO/RF PIC provides a common architecture to feed both optical and RF phased arrays from a single chip that may be used for guidance, mobile data links, autonomous vehicles and 5G cellular communications.

As shown in FIG. 1a, a dual Optical/RF (O/RF) PIC 100 (and RF phased arrays) may be mounted on a mobile platform 102 such as a drone, manned vehicle etc. In one configuration, the steerable RF and optical beams 104 and 106 may be used to interrogate another mobile platform 108 with wavelengths covering LADAR/LIDAR and RADAR bands from a single integrated system. In another configuration, the steerable RF 104 beam may be used to detect, track and establish a low data rate communications link with another mobile platform 108. The steerable optical beam 106 can be used to establish a high data rate link with the other mobile platform. Note, given the same number of elements in the phased array, the RF beam will naturally be considerably wider given the disparity in wavelengths. Thus the RF beam is better suited for initial detection of the opposite platform and to establish the link. The narrower optical beam provides a much higher data rate capability.

As shown in FIG. 1b, a number of dual O/RF PICs 110 (and RF phased arrays) are mounted on an autonomous vehicle 112 and controlled by an autonomous controller 113. The steerable optical beam 114 and steerable RF beam 116 cover LADAR/LIDAR and RADAR bands from a single integrated system to interrogate the environment and facilitate autonomous navigation.

As shown in FIG. 1c, one or more dual O/RF PICs 120 (and RF phased arrays) may be mounted on cellular towers 122. Both the RF and optical beams 124 and 126 may be used to establish a 5G communications link with another cellular tower 122 or individual cell phones 128. RF data 130 can be transmitted over either the RF or optical links. The cell phones must remain within a direct line-of-sight (LOS) and visible to maintain the optical data link with the cell tower.

In each of these applications, the capability to ensure that the steerable RF and optical beams are (or can be) co-boresighted (e.g. the respective transmission axes are aligned within a specified and tight linear and angular tolerance) is critical. For example, the optical beam can be quite narrow, which could make it very difficult to establish and maintain the high data rate optical with another platform. The RF beam is much broader and thus well suited to detect other platforms and initialize communications. A tight co-boresighting of the optical beam to the RF beam (e.g. within one half the optical beamwidth) improves the reliability of the optical link.

Figure 2:
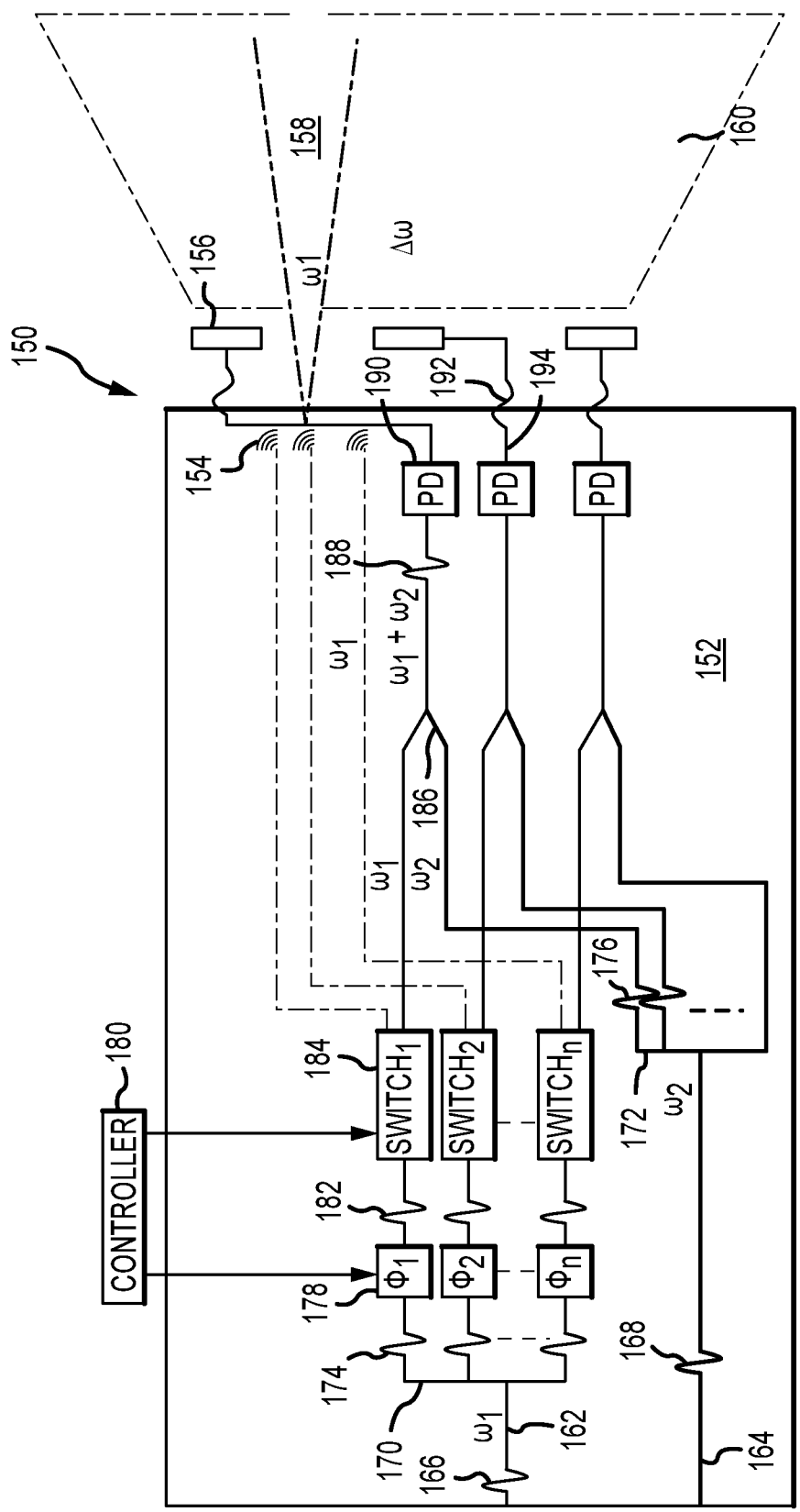
FIG. 2 is a diagram of an embodiment for a switchable optical feed network for co-boresighted optical and RF phased arrays.

In reference to FIG. 2, an embodiment of a dual optical and RF phase array 150 that comprises a PIC 152 that provides a common architecture to feed both optical phased arrays 154 and RF phased arrays 156 from a single chip to generate either coincident or time multiplexed steerable optical and RF beams 158 and 160. The RF phased array may be discrete off-chip antennas or monolithically fabricated on the PIC.

PIC 152 includes monolithically fabricated first and second optical waveguides 162 and 164 configured to receive first and second optical signals 166 and 168 at frequencies $\omega 1$ and $\omega 2$ having a frequency difference equal to a desired RF frequency. In an alternate embodiment, the PIC may be configured to receive the first optical signal at frequency $\omega 1$ and the RF signal as inputs and generate the second optical signal at frequency $\omega 2$ on the PIC. In another embodiment, a laser source for the optical signal at frequency $\omega 1$ is provided on-chip. The laser source can be grown directly onto the PIC with an active material such as III-V material or with quantum dots. First and second optical waveguide 1:N splitters 170 and 172 split each of the first and second optical signals 166 and 168 into an equal number N of ω1 and ω2 optical channel signals 174 and 176. A plurality of electro-optical phase modulators 178 responsive to steering command signals from a controller 180 phase modulate the ω1 optical channel signals 174, respectively, to produce phase-shifted ω1 optical channel signals 182.

A plurality of switches 184 responsive to switching command signals from controller 180 selectively re-direct the phase-shifted first optical channel signals 182 to the optical phased array 154 to produce the steerable optical beam 158 or pass the signals 182 forward to a plurality of optical waveguide 2:1 combiners 186. The switches may be "binary" switches that redirect effectively 100% of the optical power to either the optical phased array or the combiner, in which case the controller time multiplexes the optical and RF beams. The controller may modify the duty cycle as dictated by a particular application or changing conditions of the application. The switches may also be "variable" switches that apportion the optical power 0-100% between both the optical phased array and the combiner, in which case coincident optical and RF beams are produced. The controller can modify the amount of optical power directed to either channel as dictated by a particular application or changing conditions of the application. In an alternate embodiment, the switches may be wavelength selective binary/variable switches that are positioned after combiners 186.

Combiners 186 combine the phase-shifted ω1 optical channel signals 182 and ω2 optical channel signals 176, respectively, to form combined optical channel signals 188, which are fed to a plurality of photo-detectors 190. Each combiner may feed L photo-detectors to match the optical power provided by the feed network to the capabilities of the photo-detectors to avoid damaging the devices and to maximize RF power. The photo-detectors may be monolithically fabricated on the PIC or discrete devices off-chip. The photo-detectors 190 convert the combined optical channel signals 188 to RF electrical feed signals 192 at the desired RF frequency. Feed signals 192 are provided to RF bond pads 194 on the chip to drive the RF phased array 156 to produce steerable RF beam 160.

To ensure that the steerable optical beam 158 and the steerable RF beam 160 are co-boresighted to a tight alignment tolerance, the PIC 152 is positioned with an RF antenna array footprint defined by an outer periphery of the RF phased array 156. At the applicable RF and optical frequencies, the PIC 152 is small enough that it can be positioned between RF antenna elements, in place of one RF antenna elements in a critically spaced RF phased array or within a sparse RF phased array. Positioning of the PIC 152 within the footprint ensures that the optical and RF beams are co-boresighted.

Figure 3:
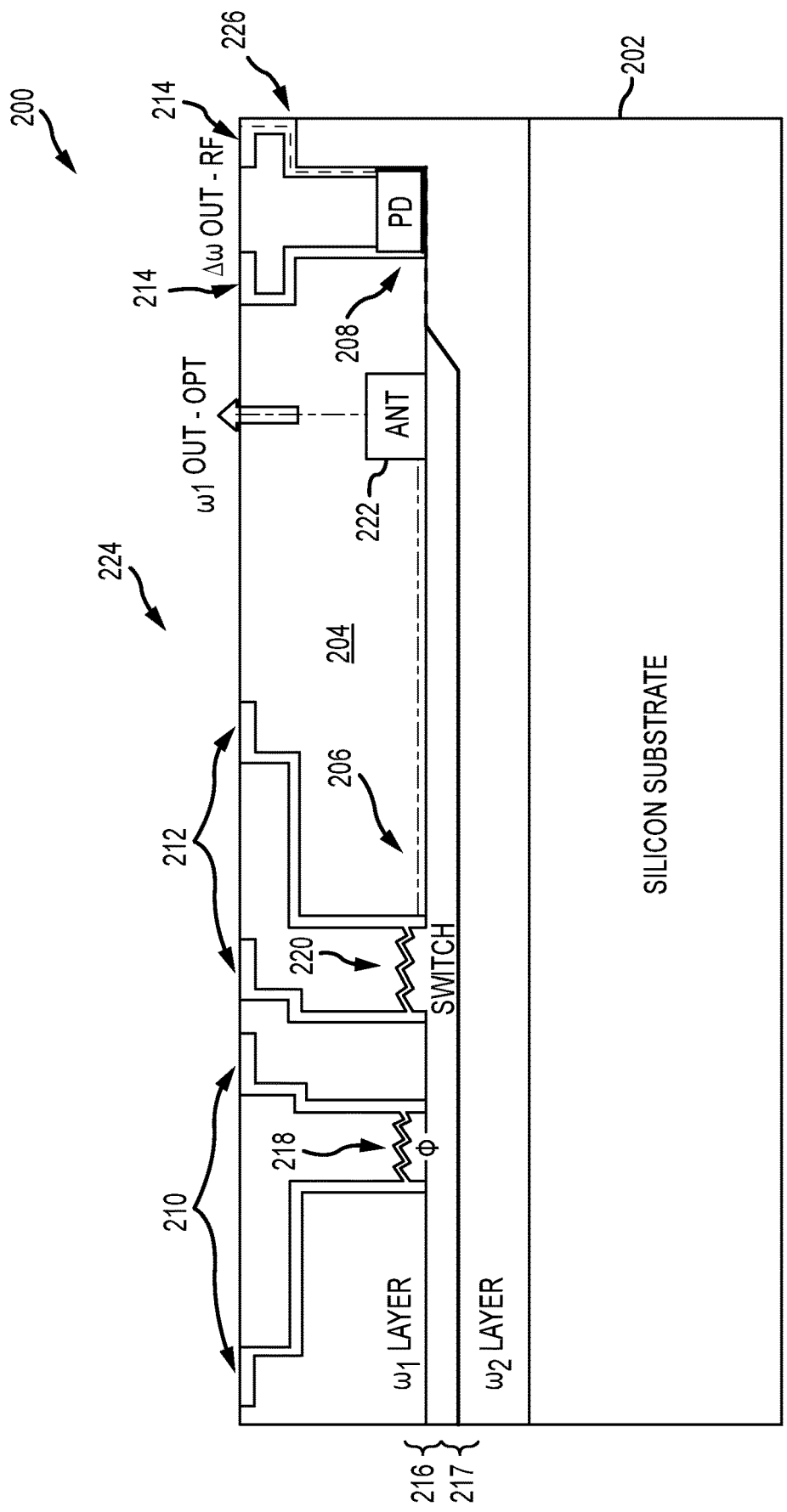
FIG. 3 is a side view of a monolithically fabricated PIC in which the switchable optical feed network and OPA resides in multiple layers.

In reference to FIG. 3, an embodiment of a dual optical and RF phased array PIC 200 is monolithically fabricated using Silicon processing on a silicon substrate 202. Layers of SiO$_2$ 204 in which the optical feed network 206, photo-detectors 208 and metallization for phase modulator contacts 210, switch contacts 212 and RF bond pads 214 are formed provide thermal and electrical insulation. In this embodiment, the ω1 and ω2 portions of the optical feed network 106 are formed in different optical layer(s). The multi-layer implementation avoids the need for waveguide crosses and may provide for a more compact topology.

The optical feed network 206 is suitably fabricating using standard fabrication techniques to form the optical waveguides 162, 164, the optical splitters 170, 172 and optical combiners 186 shown in FIG. 2 in optical layers 216 and 217, suitably formed from doped Silicon material. Electrically driven phase modulators 218 and optical switches 220 are formed in optical layer 216 using P/N junctions doped with Boron, Aluminum, Gallium Indium (p-type) or Phosphorous, Antimony, Arsenic or Lithium (n-type) dopant materials. Optical antennas 222 are formed in optical layer 216 as gratings that redirect light 224 (phase modulated light at ω1) upward away from the substrate. The optical waveguides and splitter for light at frequency ω1 are formed in optical layer 217 and directed upwards to optical layer 216 to the combiners. Photo-detectors 208 are formed on top of optical layer 216, typically of Germanium. The photo-detectors 208 convert light into an electrical feed signal 226 (RF frequency) that is output via one side of RF bond pads 214 (the other side being ground).

In an embodiment thermal phase modulators 218 and optical switches 220 are implemented using smaller heater elements to locally change the refractive index of the optical waveguide. In phase modulator 218, a heater is embedded into the optical waveguide to take advantage of the temperature dependent silicon index to add voltage-controlled phase retardation. The large thermo-optic index change in silicon induces this phase retardation or shift. The phase shifter is compact but relatively slow compared to electro-optic shifters, which are an alternative. In optical switch 220, the optical signal is split into two arms with a phase modulator in the form of a heater embedded in one arm. The phase difference between the two arms will switch the light % between outputs 1 and 2. The phase accumulated through each arm is converted to amplitude response when these signals interfere with each other through a combiner at the end of the arms.

Figures 4A, 4B:
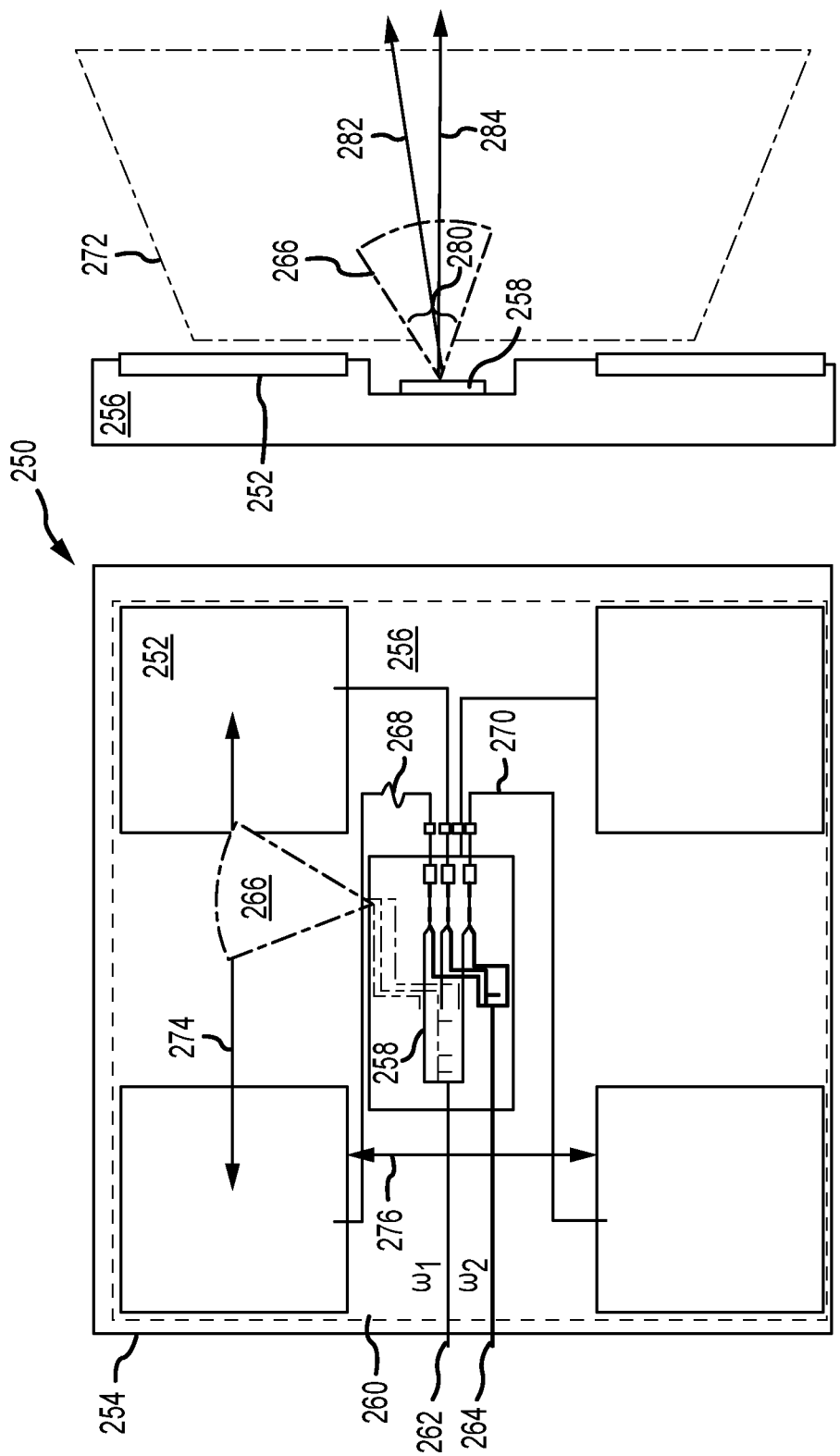
FIGS. 4a and 4b are top and side views of the PIC positioned within the footprint of the RF antenna array.

In reference to FIGS. 4a and 4b, an embodiment of dual O/RF phased array 250 includes N×O RF patch antennas 252 that define an RF phased array 254 mounted on a carrier 256. An O/RF PIC 258 is mounted on carrier 256 in the space between RF patch antennas 252 within an RF antenna array footprint 260 defined by an outer periphery of the RF phased array 254. The O/RF PIC 258 receives optical input signals ω1 and ω2 via optical fibers 262 and 264 and generates a steerable optical beam 266 perpendicular to the surface of the PIC and carrier 256. The O/RF PIC 258 also generates RF electrical feed signals 268 that are routed via signal paths 270 on the surface of carrier 256 to the respective patch antennas 252 to generate a steerable RF beam 272 perpendicular to the surface of the carrier 256. The steerable optical beam 266 is generated and exists within the steerable RF beam 272 and thus maintains tightly aligned co-boresighting (as desired). Optionally, the beams can be time multiplexed and independently steered.

The RF band spans 20 KHz to 300 GHz. The center-to center spacing 274 between patch antennas 252 is optimally one-half wavelength (λ/2) for critically spaced elements in a periodic array, leaving a spacing 276 of approximately quarter-wavelength worst case. The optical spectrum ranges from 20 THz (infrared) to 750 THz (ultraviolet) with 193 THz (1550 nm) being standard for telecommunications. Accordingly, the PIC is approximately 1 mm×1 mm up to several square mm and about 5 mm×5 mm or larger for telecommunications frequencies depending on the size of the array. As a result, the PIC can be positioned inside the RF phased array, either between critically spaced RF antenna elements, in place of an RF antenna element or within a sparse RF phased array in which the elements are not critically spaced (spaced >λ/2) and the array pattern is not confined to periodic spacing. If the PIC is too large, the PIC may be broken up and distributed over multiple PICs within the RF phased array footprint using a common optical source and controller. This ensures tight alignment of the co-boresighted optical and RF beams. For example, an X-band RF at 10 GHz has a wavelength of 30 mm with a spacing of 15 which easily accommodates a 5 mm×5 mm PIC. At 100 GHz, the wavelength is 3 mm giving a spacing of 1.5 mm. In this case, the PIC might replace an RF antenna element if critically spaced, be positioned in a sparse array or be broken in to multiple PICs.

As shown in FIG. 4b, the optical beam 266 and RF beam 272 are co-boresighted. Optical beam 266 has a beamwidth 280 (measured in degrees) about a transmit axis 282. The optical beam's transmit axis 282 is aligned to the RF beam's transmit axis 284 to an angular tolerance of no greater than one half the optical beamwidth 280. Assuming that the RF antenna array and PIC are both flat on the carrier or substrate (or within an alignment tolerance for mounting on the carrier or fabrication on the substrate), positioning the PIC 258 within the RF antenna array footprint 260 ensures the angular alignment specification is satisfied for the RF and optical frequencies of interest.

Figure 5:
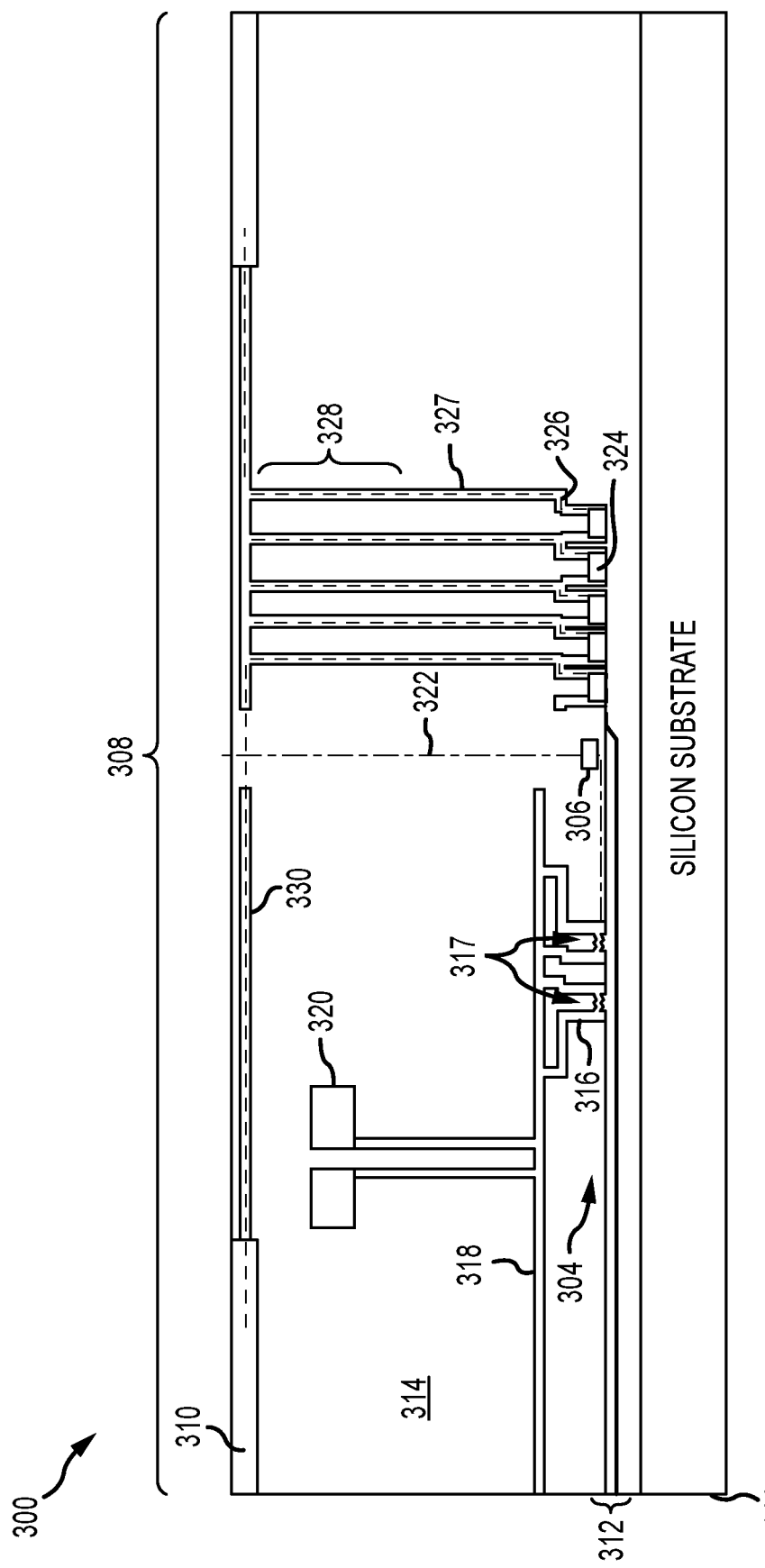
FIG. 5 is a side view of a monolithically fabricated PIC in which the RF antenna array is integrated with the switchable optical feed network and OPA.

In reference to FIG. 5, an embodiment of a dual optical and RF phased array PIC 300 is monolithically fabricated using Silicon processing on a silicon substrate 302 to include an optical feed network 304, an optical phased array 306 and an RF phased array 308. Full monolithic integration provides a desirable advantage of having the entire feed modulate formed on a single chip. The drawbacks include the cost of the wafer and wafer processing to accommodate the RF phased array, which is much larger than the optical phased array and feed network. In fact, the optical feed network and optical phased array are small enough to be fabricated between individual radiating elements 310 of the RF phased array or in place of one such element.

Optical feed network 304 is formed in optical layer(s) 312 in the insulating layer 314. Metallization 316 couples the photonic components 317 (phase modulators, switches) to an electrical control layer 318 and electrical control components 320. An optical via 322 routes light vertically from optically phased array 306 out of the chip. Photo-detectors 324 are formed on top of the optical layer(s) and coupled to RF bond pads 326. Electrical vias 327 route the RF feed signals vertically through electrical components 328 such as transistors, amplifiers etc. to an RF signal layer 330 on the surface of the chip where the RF signals are distributed to the radiating elements 310 of the RF phased array 308.

As shown in FIGS. 6, 7a-7b and 8a-8b, multiple O/RF PICs and RF phased arrays can be configured to take advantage of the co-boresighting of each PIC's optical and RF beams to, for example, increase the optical and RF power or to cover a much larger aperture.

Figure 6:
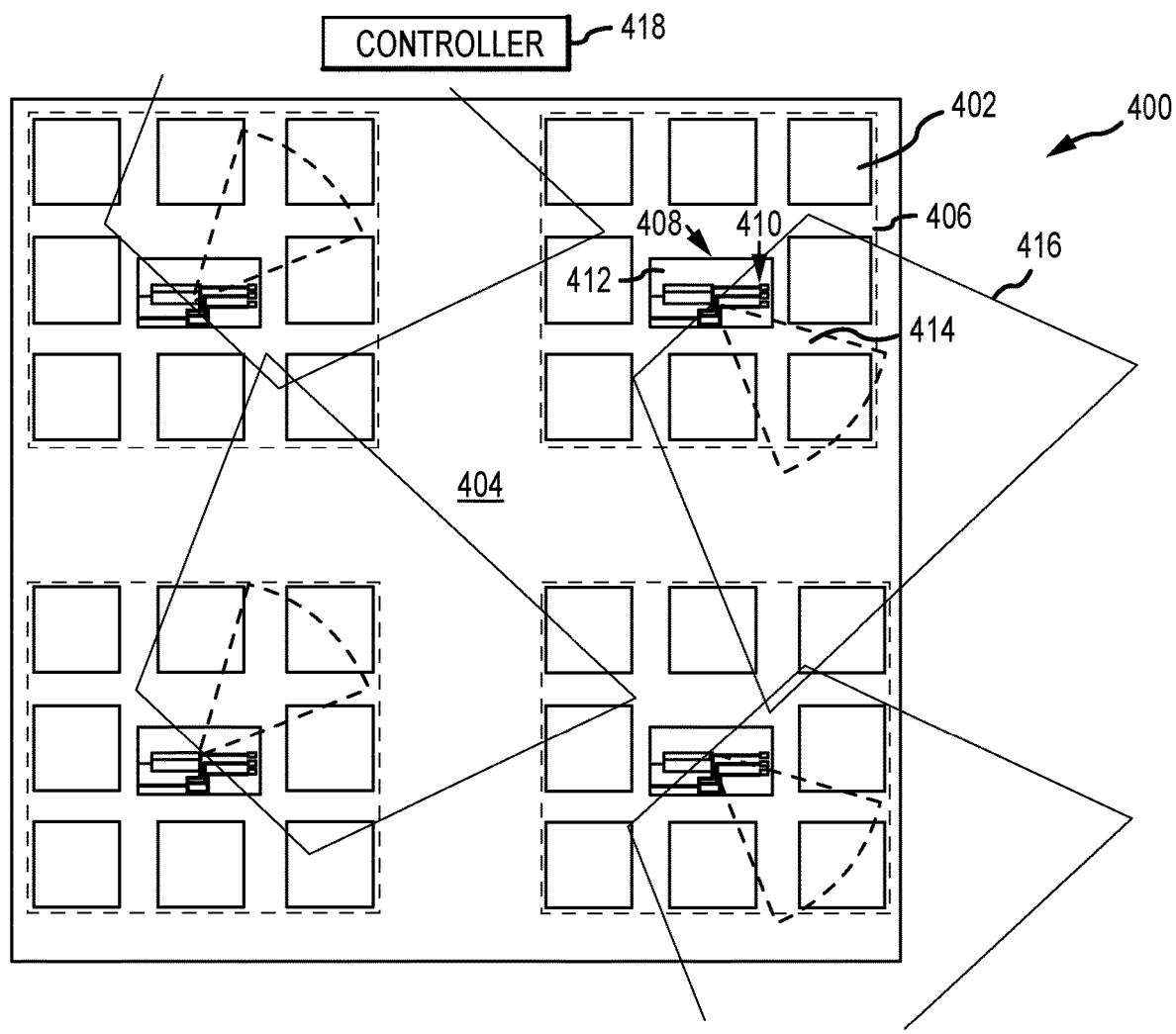
FIG. 6 is a top view of an array of M switchable optical/RF sources.

As shown in FIG. 6, a co-boresighted dual O/RF phased array 400, comprises M RF antenna arrays 402 positioned on a surface 404. The perimeter around each phased array defines a respective RF antenna footprint 406. M modules 408 are positioned within a different RF antenna footprint 406 and connected to feed the different RF antenna arrays 402.

Each said module 408 includes a plurality of photo-detectors (PDs) 410 and a monolithically fabricated photonic integrated circuit (PIC) 412. The PDs may be discrete devices or integrated on the PIC. As previously described, each PIC includes an optical feed network that splits first and second optical signals having a frequency difference directly proportion to a desired RF reference into an equal number of first and second optical channel signals, responsive to steering command signals phase modulates the first optical channel signals, and combines the phase-shifted first and the second optical channel signals. A plurality of switches responsive to switching command signals to selectively re-direct the phase-shifted first optical channel signals to a respective plurality of optical antennas to produce a steerable optical beam 414 or the combined optical signals to the plurality of PDs, which convert the optical signals to RF electrical feed signals that drive the respective RF antennas to produce a steerable RF beam 416 at the desired RF reference frequency. Given the same steering command signals, the steerable optical and RF beams are co-boresighted.

A controller 418 is configured to provide each PIC with the steering and switch command signals to selectively produce and steer the co-boresighted RF and optical beams 416 and 414 and to coordinate the steering of the M co-boresighted RF and optical beams.

As shown in FIGS. 7a-7b, the M RF antenna arrays and modules are arranged on a flat or convex surface on a mobile platform 420. In a first mode the M co-boresighted RF and optical beams 416 and 414 point in the same direction at a single mobile platform 422 to maximize power in the RF and optical beams 416 and 414. In a second mode the M co-boresighted RF and optical beams 416 and 414 point in different directions to simultaneously independently interrogate multiple mobile platforms 422.

Figure 8A:
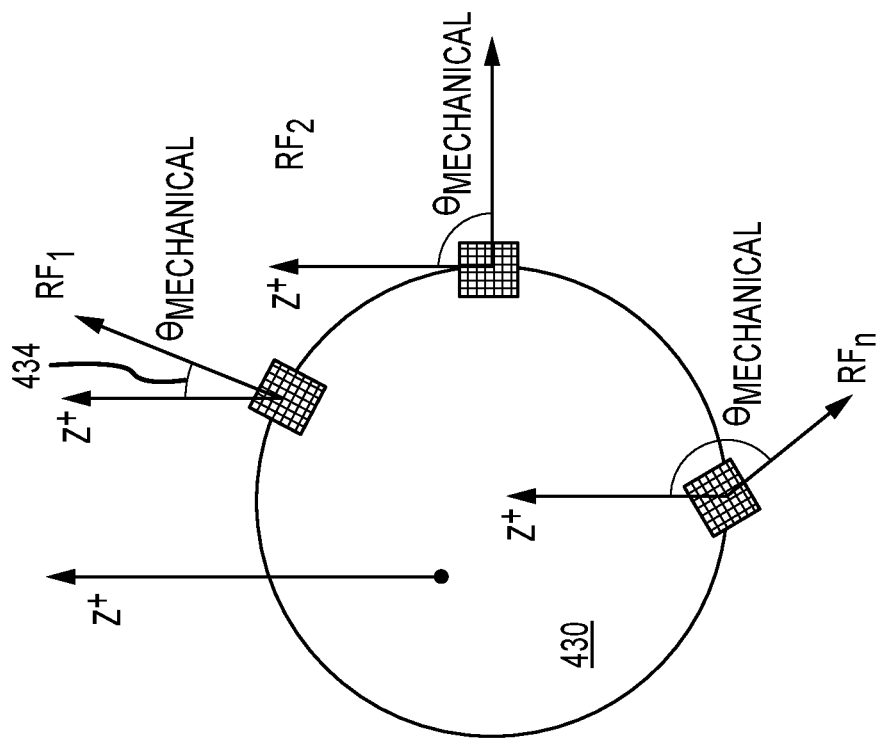
FIGS. 8a and 8b illustrate a circular or spherical array in which the switchable optical/RF sources act together to address a larger aperture or extended FOV.
Figure 8B:
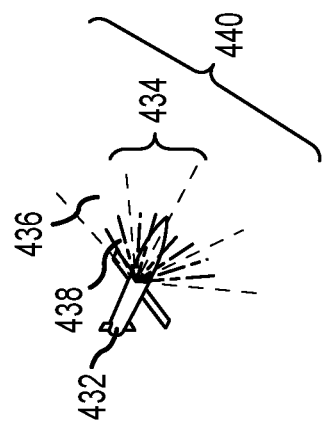

As shown in FIGS. 8a-8b, the M O/RF phased arrays are arranged on a circular or spherical surface 430 on a mobile platform 432. Each O/RF array covers a different sub-aperture 434 where $\theta_{mechanical}$ ($RF_1$) not equal to $\theta_{mechanical}$ ($RF_2$) not equal to $\theta_{mechanical}$ ($RF_n$) measured relative to some normal axis to the surface denoted by z+. For example, the RF beam 436 may have a beam width of approximately 1-2° and the optical beam 438 may have a beam width of approximately 0.1 to 0.5° and be steerable to address a sub-aperture (or FOV) of 25° (+/−12.5°) with an angular alignment tolerance of half the optical beam width. For example, an RF beam having a beamwidth of 2° and an optical beam having a beamwidth of 0.5° may be co-boresighted to an angular alignment tolerance of no more than −0.25° (+/−0.125°) to address a FOV of 25°. These can be tiled to N O/RF arrays to cover an aperture 440 360 degrees for a circular surface or 4*pi steradians for a spherical surface. The sub-apertures may be configured to overlap or not. Some amount of overlap can facilitate hand-off of targets or data links as they move from one O/RF array to another.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A co-boresighted dual optical and RF phased array, comprising:
    an array of RF antennas, a perimeter around said array defining an RF antenna array footprint;
    a plurality of photo-detectors (PDs) positioned within the RF antenna array footprint;
    a photonic integrated circuit (PIC) positioned within the RF antenna array footprint, the PIC including
        an optical feed network that splits first and second optical signals having a frequency difference equal to a desired RF reference into an equal number of first and second optical channel signals, responsive to steering command signals phase modulates the first optical channel signals, and combines the phase-shifted first and the second optical channel signals;
a plurality of optical antennas; and
a plurality of switches responsive to switching command signals to selectively re-direct the phase-shifted first optical channel signals to the respective plurality of optical antennas to produce a steerable optical beam or the combined optical signals to the plurality of PDs, which convert the optical signals to RF electrical feed signals that drive the respective RF antennas to produce a steerable RF beam at the desired RF reference frequency,
wherein given the same steering command signals the steerable RF beam and steerable optical beam are co-boresighted.

2. The co-boresighted dual optical and RF phased array of claim 1, wherein the optical beam is transmitted along a first axis and the RF beam is transmitted along a second axis, wherein the first and second axis are aligned.

3. The co-boresighted dual optical and RF phased array of claim 1, wherein the RF antennas are arranged in a sparse array in which the antennas are not critically spaced and not confined to a periodic array, wherein the PIC is positioned within that sparse array.

4. The co-boresighted dual optical and RF phased array of claim 1, wherein the array includes a rectangular arrangement of periodically and critically spaced N×O RF antennas where N and O are integers, wherein the PIC is either positioned between adjacent RF antennas or in place of one of the RF antennas.

5. The co-boresighted dual optical and RF phased array of claim 1, wherein optical and RF beams are co-boresighted with an angular tolerance of at most one half the beamwidth of the optical beam.

6. The co-boresighted dual optical and RF phased array of claim 1, wherein the plurality of switches are binary switches that switch all of the optical power of the phase-shifted ω1 optical channel signals between the respective optical antennas and the respective optical waveguide combiners to time multiplex the steerable optical beam and the steerable RF beam.

7. The co-boresighted dual optical and RF phased array of claim 6, wherein in a first mode the phase modulators are responsive to the same steering command to generate the co-boresighted optical and RF beams and in a second mode responsive to different steering commands to independently steer the optical and RF beams.

8. The co-boresighted dual optical and RF phased array of claim 1, wherein the plurality of switches are variable switches that apportion the optical power of the phase-shifted ω1 optical channel signals between the respective optical antennas and the respective optical waveguide combiners to generate the co-boresighted steerable optical beam and the steerable RF beam at the same time.

9. The co-boresighted dual optical and RF phased array of claim 1, further comprising a mobile platform on which the phased array is mounted, said steerable RF beam used to detect, track and establish a communications link with another mobile platform, said steerable optical beam used to establish a high data rate link with the other mobile platform.

10. The co-boresighted dual optical and RF phased array of claim 1, further comprising an autonomous vehicle on which the phased array is mounted, wherein the steerable optical beam and steerable RF beam cover LADAR/LIDAR and RADAR bands from a single integrated system.

11. The co-boresighted dual optical and RF phased array of claim 1, further comprising a cellular tower on which the phased array is mounted, said steerable RF beam used to establish a 5G communications link with another cellular tower or individual cell phones, said steerable optical beam used to establish a high data rate link with the other cellular tower or individual cell phones within line-of-sight (LOS).

12. The co-boresighted dual optical and RF phased array of claim 1, wherein the PDs are monolithicially fabricated on the PIC.

13. The co-boresighted dual optical and RF phased array of claim 12, wherein the RF antennas are monolithically fabricated on the PIC.

14. A co-boresighted dual optical and RF phased array, comprising:
a photonic integrated circuit (PIC) including an array of RF antennas, a perimeter around said array defining an RF antenna array footprint;
a plurality of photo-detectors (PDs) positioned within the RF antenna array footprint;
an optical feed network that splits first and second optical signals having a frequency difference equal to a desired RF reference into an equal number of first and second optical channel signals, responsive to steering command signals phase modulates the first optical channel signals, and combines the phase-shifted first and the second optical channel signals;
a plurality of optical antennas positioned within the RF antenna footprint; and
a plurality of switches responsive to switching command signals to selectively re-direct the phase-shifted first optical channel signals to the respective plurality of optical antennas to produce a steerable optical beam or the combined optical signals to the plurality of PDs, which convert the optical signals to RF electrical feed signals that drive the respective RF antennas to produce a steerable RF beam at the desired RF reference frequency,
wherein given the same steering command signals the steerable RF beam an steerable optical beam are co-boresighted.

15. A co-boresighted dual EO/RF phased array, comprising:
M RF antenna arrays, a perimeter around each array defining a respective RF antenna footprint;
M modules positioned within a different RF antenna footprint and connected to feed the different RF antenna arrays, each said module including
a plurality of photo-detectors (PDs); and
a monolithically fabricated photonic integrated circuit (PIC) including
an optical feed network that splits first and second optical signals having a frequency difference directly proportion to a desired RF reference into an integer number of first and second optical channel signals, responsive to steering command signals phase modulates the first optical channel signals, and combines the phase-shifted first and the second optical channel signals;
a plurality of optical antennas; and
a plurality of switches responsive to switching command signals to selectively re-direct the phase-shifted first optical channel signals to the respective plurality of optical antennas to produce a steerable optical beam or the combined optical signals to the plurality of PDs, which convert the optical signals to RF electrical feed signals that drive the respective RF antennas to produce a steerable RF beam at the desired RF reference frequency, wherein given the same steering command signals said steerable optical and RF beams are co-boresighted; and a controller configured to provide each PIC with the steering and switch command signals to selectively produce and steer the co-boresighted RF and optical beams.

16. The co-boresighted dual optical and RF phased array of claim 15, wherein the M RF antenna arrays are arranged on a flat or convex surface, wherein in a first mode the M co-boresighted RF and optical beams point in the same direction to maximize power in the RF and optical beams and in a second mode the M co-boresighted RF and optical beams point in different directions.

17. The co-boresighted dual optical and RF phased array of claim 15, wherein the M RF antenna arrays are arranged on a circular or spherical surface so that each array addresses a different sub-aperture of a larger aperture.

* * * * *